US009238447B2

(12) United States Patent
Hoika et al.

(10) Patent No.: US 9,238,447 B2
(45) Date of Patent: Jan. 19, 2016

(54) BELT LOCK FEEDER

(71) Applicant: TRW Automotive GmbH, Alfdorf (DE)

(72) Inventors: Christian Hoika, Vellberg (DE); Wolfgang Holbein, Alfdorf (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 14/420,711

(22) PCT Filed: Jul. 29, 2013

(86) PCT No.: PCT/EP2013/002246
§ 371 (c)(1),
(2) Date: Feb. 10, 2015

(87) PCT Pub. No.: WO2014/026734
PCT Pub. Date: Feb. 20, 2014

(65) Prior Publication Data
US 2015/0203069 A1    Jul. 23, 2015

(51) Int. Cl.
*B60R 22/03*    (2006.01)
*B60R 22/20*    (2006.01)
*B60R 22/18*    (2006.01)

(52) U.S. Cl.
CPC .................. *B60R 22/03* (2013.01); *B60R 22/18* (2013.01); *B60R 22/20* (2013.01); *B60R 2022/1806* (2013.01); *B60R 2022/208* (2013.01)

(58) Field of Classification Search
CPC ........ B60R 22/03; B60R 22/18; B60R 22/20; B60R 2022/1806; B60R 2022/208; Y10T 24/40
See application file for complete search history.

(56) References Cited

U.S. PATENT DOCUMENTS

| 7,997,620 | B1 | 8/2011 | Dong et al. | |
| 2005/0206150 | A1* | 9/2005 | Yamaguchi | B60R 22/03 280/801.1 |
| 2005/0224270 | A1* | 10/2005 | Holbein | B60R 22/03 180/268 |
| 2006/0076767 | A1* | 4/2006 | Hippel | B60R 22/03 280/806 |
| 2011/0057432 | A1* | 3/2011 | You | B60N 2/688 280/804 |
| 2012/0299282 | A1* | 11/2012 | Holbein | B60R 22/03 280/806 |
| 2014/0265503 | A1* | 9/2014 | Thomas | B60N 2/16 297/344.13 |
| 2015/0210238 | A1* | 7/2015 | Biegun | B60R 21/02 297/487 |

FOREIGN PATENT DOCUMENTS

DE     102005021281     11/2006

* cited by examiner

*Primary Examiner* — Faye M Fleming
(74) *Attorney, Agent, or Firm* — Tarolli, Sundheim, Covell & Tummino LLP

(57) ABSTRACT

A belt buckle feeder for a vehicle seat belt system includes a spindle drive and a belt buckle (12) mounted on a spindle (14) of the spindle drive, the belt buckle being movable in height via a spindle nut (26) located on the spindle (14). A safety mechanism comprising at least one locking element (44) is provided which is configured so that the locking element (44) enters into force fit and/or form fit with the spindle (14), when a predetermined force threshold is exceeded, and introduces force acting on the belt buckle (12) in the extending direction (R) of the spindle (14) into a mounting point fixed to the vehicle white bypassing the spindle drive.

11 Claims, 7 Drawing Sheets

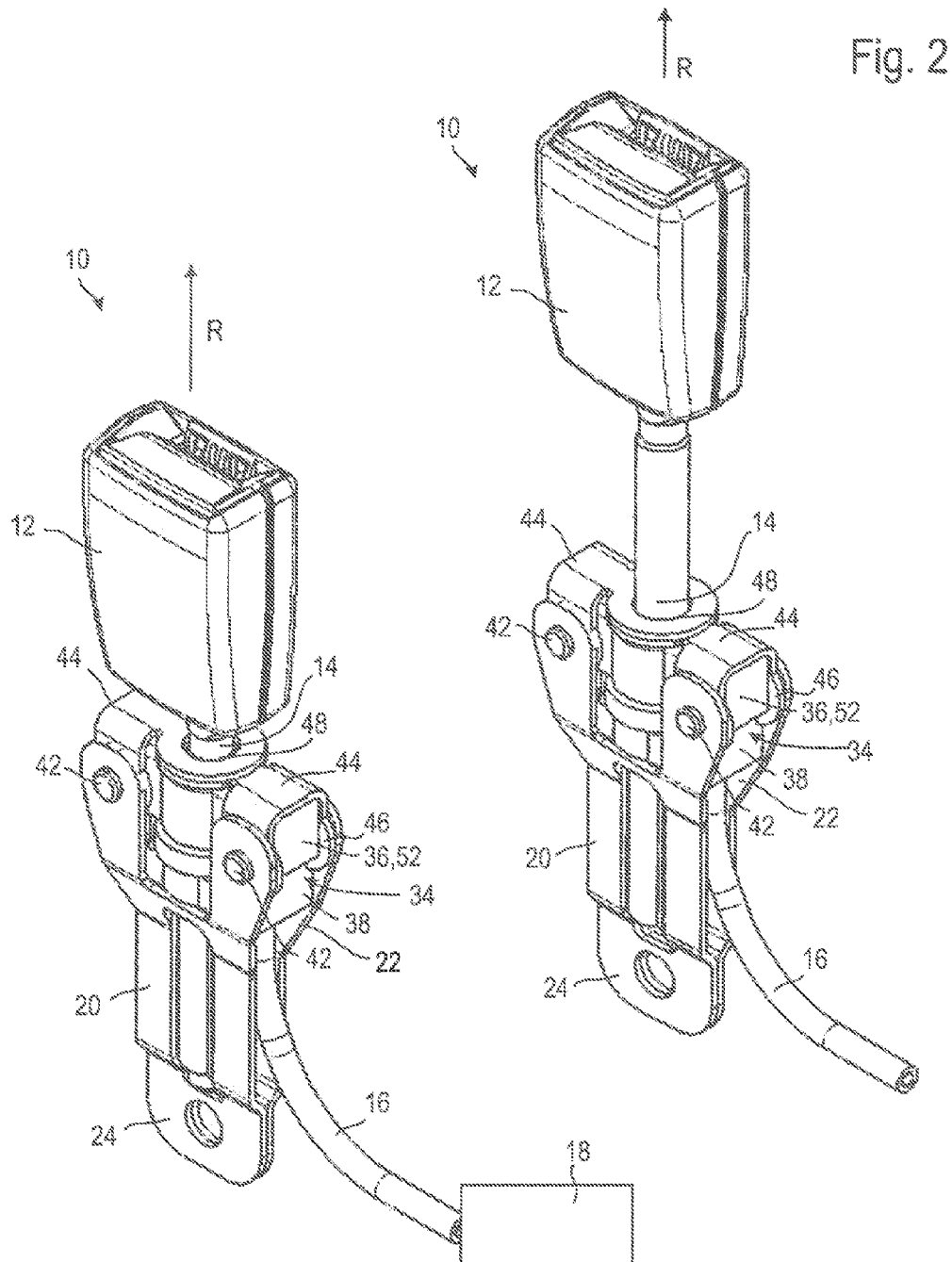

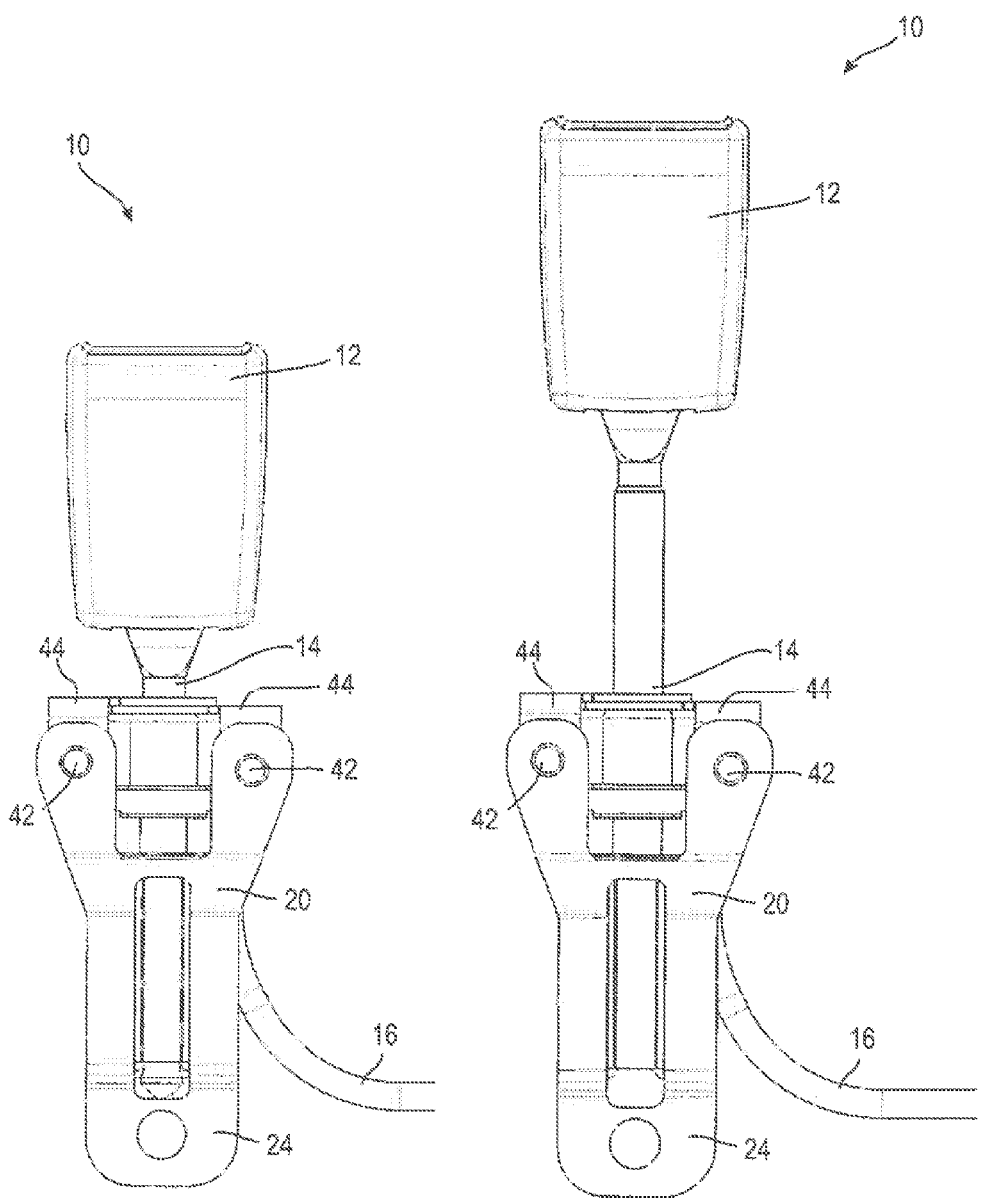

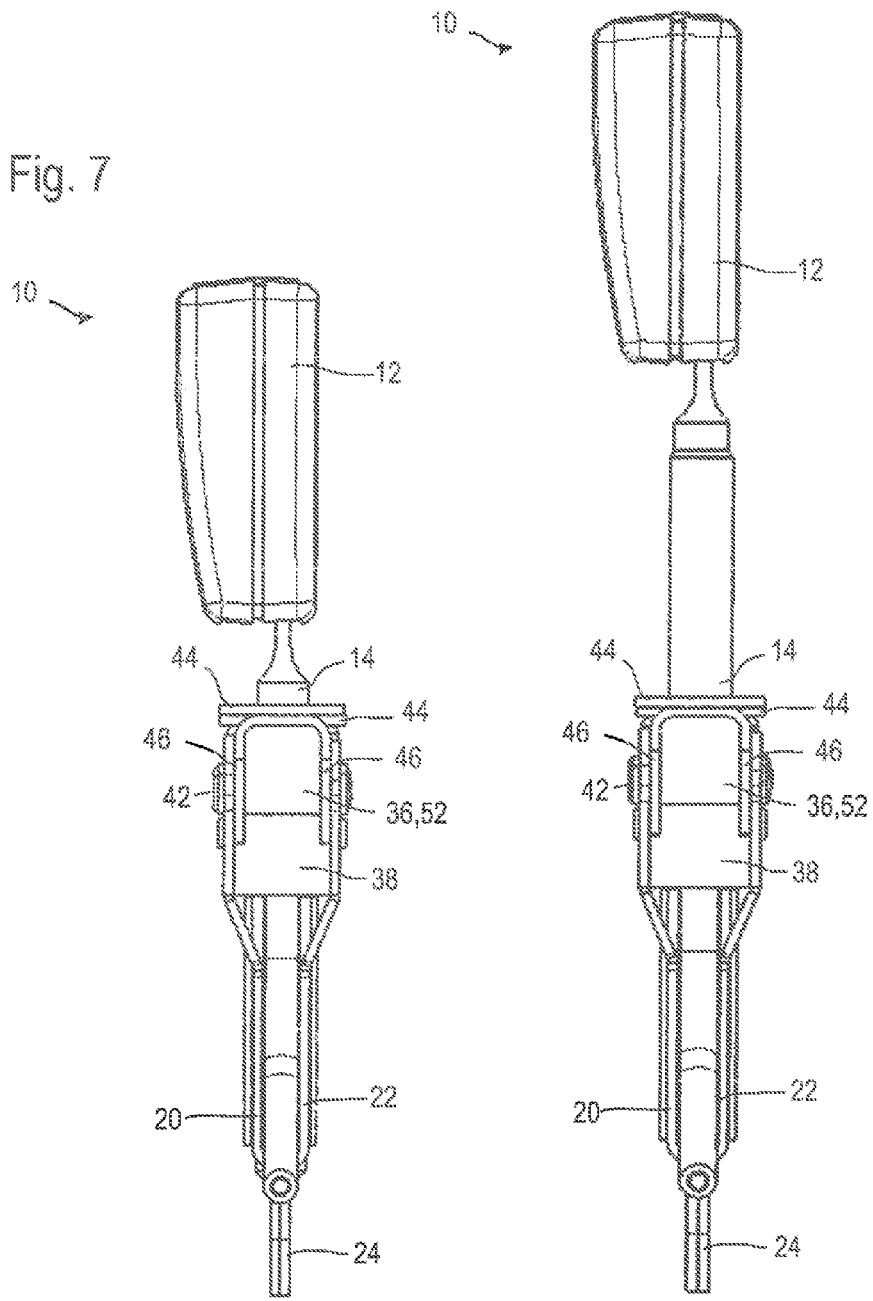

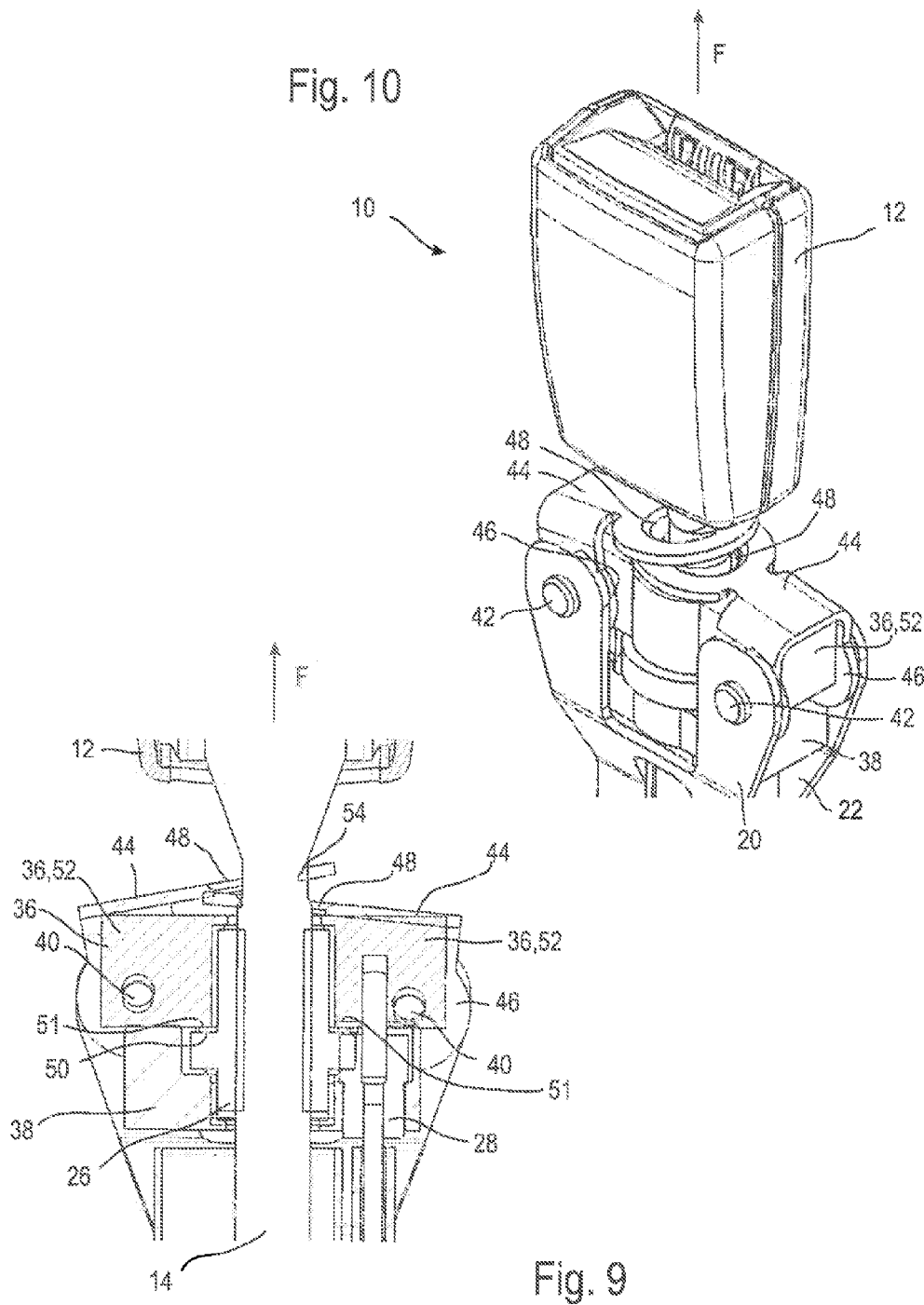

BELT LOCK FEEDER

RELATED APPLICATIONS

This application corresponds to PCT/EP2013/002246, filed Jul. 29, 2013, which claims the benefit of German Application No. 10 2012 016 211.1, filed Aug. 16, 2012, the subject matter, of which are incorporated herein by reference in their entirety.

BACKGROUND OF THE INVENTION

The invention relates to a belt buckle feeder for a vehicle seat belt system.

Belt buckle feeders as they are called assist the buckling operation in passenger cars by moving the belt buckle along a defined distance from a home position into a feeding position in which the belt buckle can be better grasped by the vehicle occupant. After inserting the plug-in tongue into the belt buckle, the latter is moved back from the feeding position into the home position.

Such system is intended to be as space-saving as possible and to be manufactured at low cost. At the same time, however, it has to be ensured that even when high forces are acting on the belt buckle, for example in the case of accident, the belt buckle cannot be removed from its home position.

SUMMARY OF THE INVENTION

It is the object of the invention to provide a belt buckle feeder which meets these requirements.

In accordance with the invention, this is achieved in a belt buckle feeder for a vehicle seat belt system including a spindle drive and a belt buckle secured to a spindle of the spindle drive and being movable in height via a spindle nut located on the spindle. A safety mechanism comprising at least one locking element is provided, wherein the safety mechanism is configured so that, when a predetermined force threshold is exceeded, the locking element enters into force fit and/or form fit with the spindle and introduces force acting in the extending direction of the spindle on the belt buckle into a mounting point fixed to the vehicle while bypassing the spindle drive. This configuration offers the option of avoiding to design the spindle drive and especially the spindle nut for the maximum forces acting during accident, thereby allowing to configure these components to be smaller, more light-weight and cost-effective. Merely the safety mechanism and the locking element have to be designed for absorbing the high forces; they are not necessarily part of the travel mechanism, however.

According to the preferred embodiment it is provided that the safety mechanism is a movable mechanical bridge capable of adopting two positions. In a first position the safety mechanism does not enter into force and/or form fit with the spindle. In the second position such force and/or form fit with the spindle is provided, however. Moreover, the safety mechanism is always tightly hinged to a vehicle-side mounting point so that, when the bridge is deflected, the direct mechanical coupling from the spindle to the mounting point is provided.

The safety mechanism preferably includes at least one deflecting member configured so that, when the force threshold is exceeded, it varies its position, thereby the locking element adopting an engaged position in which it contacts the spindle. The locking element can be a component separate from the deflecting member; however, the two components can also be tightly connected to each other.

The change of position of the deflecting member upon the application of force can be effectuated by displacing, pivoting or deforming the deflecting member. This change of position performed by the deflecting member for moving the locking element corresponds to a short extending distance of the spindle in its direction of extension toward the feeding position. This distance preferably amounts to not more than few millimeters.

The deflecting member is deflected, for example, by the spindle nut when the predetermined force is exceeded. The deflecting member can be a bearing of the spindle nut. The bearing is a component constantly in contact with the spindle nut to which direct force transmission by the spindle not in the case of tensile force acting on the spindle is easily possible. The bearing of the spindle nut simultaneously can be the bearing of the spindle drive.

When the predetermined force threshold is exceeded by force acting on the spindle nut, the deflecting member can deform or pivot by the force transmitted from the spindle nut to the deflecting member and thus can deflect the locking element into the engaged position.

The locking element should be configured to be dimensionally stable even above the force threshold in the case of the forces usually occurring during an accident, advantageously also during a serious accident.

There can be provided two locking elements which are preferably facing each other with the spindle being arranged there between.

The predetermined force threshold preferably is approx. 7 to 9 kN. With forces of this order the deflecting member, i.e. for example the bearing of the spindle nut, then will advantageously yield. Of preference, the spindle nut itself and the connection of the spindle nut to the spindle thread are designed for forces ranging from 10 to 15 kN so as to form a safety margin. A breaking load of the locking element, on the other hand, preferably is more than 25 kN so as to ensure safe restraint of the vehicle occupant even in the event of serious accidents.

Forces above the predetermined force threshold can be introduced directly from the locking element into a mounting of the belt buckle feeder fixed to the vehicle and in this way virtually completely bypass the spindle drive including the spindle and the spindle nut.

It is possible to pivot the locking element to the deflecting member and/or to a casing shell. For example, the locking element can be riveted to the casing shell.

A pivoting motion of the locking element for moving the latter into the engaged position is advantageous, as a change of position of the deflecting member can be easily transformed into such pivoting motion, without the deflecting member having to cover large distances.

The locking element preferably can be coupled to the spindle between the buckle head and the spindle nut. In this manner tensile forces can be directly transmitted from the belt buckle via the stable spindle to the locking element and to the vehicle body.

The spindle nut preferably includes a stop which enters into contact with the deflecting member. Hence tensile force acting on the belt buckle is directly transmitted via the spindle nut to the deflecting member which changes its position when the tensile force exceeds the predetermined force threshold.

The stop can be in the form of a peripheral shoulder on the spindle nut, for example.

When the locking element is pivoted, a hinge point for pivoting can also be used as hinge point of the deflecting member. The deflecting member is thus enabled to both deform and pivot.

In a preferred embodiment the locking element includes an eyelet extending through the spindle, wherein in the engaged position an inner edge of the eyelet engages in the outer periphery of the spindle. In this way both a force fit and a form fit are occurring, as the inner edge of the eyelet can dig into the spindle to a certain degree. In this way a safe force-transmitting connection is formed between the spindle and the locking element.

It is sufficient to simply pivot the locking element by e.g. about 5° to 30° to incline the eyelet such that it enters into contact with the spindle. The displacement of the locking element in its engaged position thus can be caused by only a little change in position of the deflecting member.

Advantageously, the flux of force extends from the spindle via the locking element and at least one casing shell to a fastening point of the casing shell on the vehicle. The casing shell can be an outer sheath of the belt buckle feeder and can also constitute the mounting thereof fixed to the vehicle.

In a preferred embodiment the bearing, the spindle nut, the spindle and the entire spindle drive are enclosed by two casing shells.

Since the spindle nut does not have to absorb high forces, it can be manufactured of plastic material, which reduces the weight of the belt buckle feeder.

The spindle nut can be driven, for example, via a gearwheel, a worm gear or a bevel gear in a known manner.

The spindle nut can be driven directly by an electric motor, but it is of advantage to connect the spindle nut to a flexible shaft and the latter to the electric motor or to any other suitable drive.

BRIEF DESCRIPTION OF THE DRAWINGS

Hereinafter the invention will be described in detail by way of an embodiment with reference to the enclosed drawings, in which:

FIG. 1 shows a schematic perspective view of a belt buckle feeder according to the invention in its home position;

FIG. 2 shows the belt buckle feeder of FIG. 1 in its feeding position;

FIG. 5 shows a schematic front view of the belt buckle feeder of FIG. 1 in the home position;

FIG. 6 shows a schematic front view of the belt buckle feeder of FIG. 1 in the feeding position;

FIG. 7 shows a schematic side view of the belt buckle feeder of FIG. 1 in the home position;

FIG. 8 shows a schematic side view of the belt buckle feeder of FIG. 1 in the feeding position;

FIG. 9 shows a schematic sectional view of the belt buckle feeder of FIG. 1 upon application of force above the predetermined force threshold;

FIG. 10 shows a schematic perspective view of the belt buckle feeder of FIG. 9;

DESCRIPTION

Figure 3:
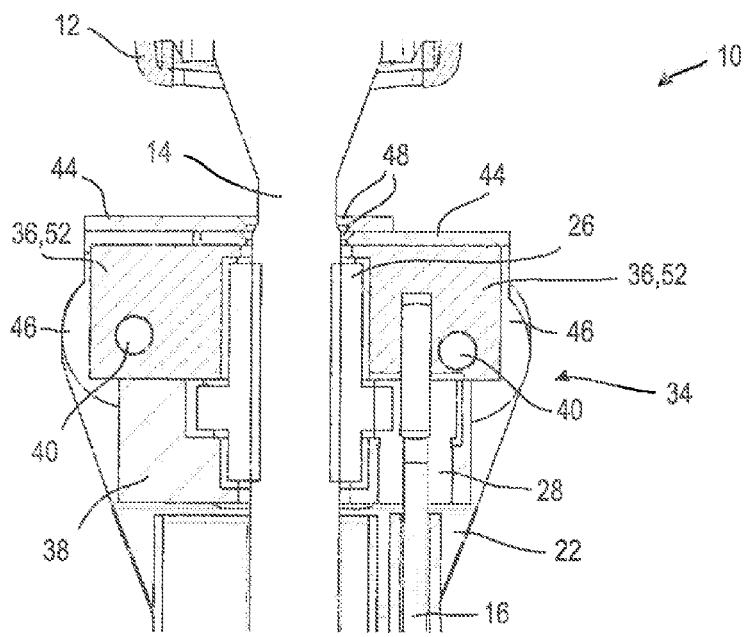
FIG. 3 shows a schematic sectional view of the belt buckle feeder of FIG. 1 in the home position.

FIG. 1 illustrates a belt buckle feeder 10 including a belt buckle 12 the lower end of which is tightly secured to a spindle 14. The spindle 14 is pan of a spindle drive described further below which in the example illustrated here is driven by means of a flexible shaft 16 coupled to an electric motor 18.

The spindle 14 can be moved in height via the spindle drive (see arrow R) so that the belt buckle 12 can adopt a home position in which the spindle 14 is most retracted and a feeding position in which the spindle 14 is most extended (see FIGS. 1 and 2, for example). The belt buckle 12 is moved into the feeding position only in driving situations related to buckling and unbuckling so that it is more convenient for a vehicle occupant to grasp the belt buckle 12. In all other driving situations the belt buckle 12 is provided in the home position (FIG. 1).

The belt buckle 12 is connected to the spindle 14 so that also high forces occurring during accident, for instance, can be transmitted from the belt buckle 12 to the spindle 14. The belt buckle 12 can be secured to the spindle 14 either rigidly or pivotally relative to the latter.

The belt buckle feeder 10 includes two casing shells 20, 22 being arranged to face each other and enclosing the spindle 14 as well as the spindle drive. Each of the two casing shells 20, 22 is bent of a sheet metal part. At a lower end the two casing shells 20, 22 converge and form a mounting portion 24 provided with an eyelet for fixedly mounting the entire belt buckle feeder 10 on the vehicle.

In the direction of the belt buckle 12 the two casing shells 20, 22 expand in the transverse direction so as to provide a compartment for the spindle drive arranged there between.

Figure 4:
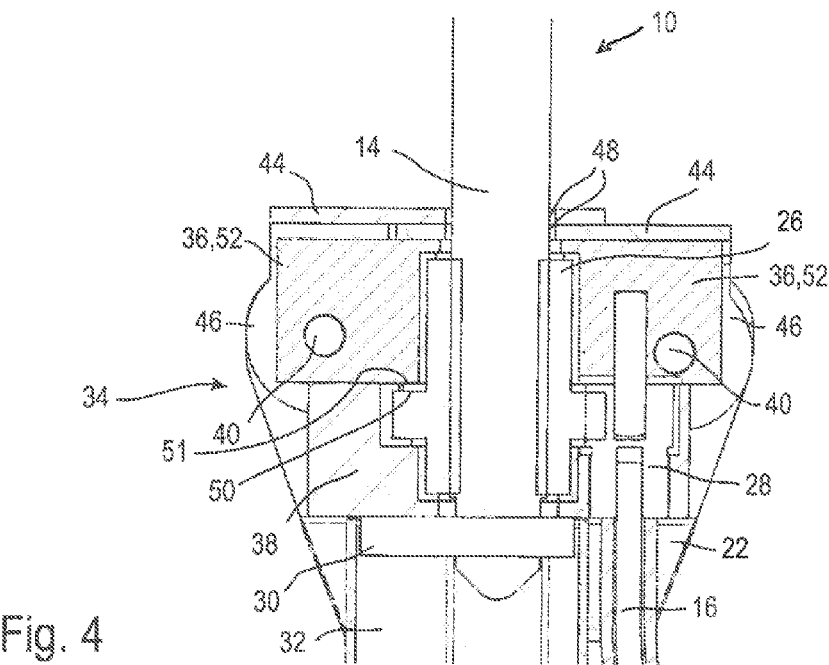
FIG. 4 shows a schematic sectional view of the belt buckle feeder of FIG. 1 in the feeding position.

FIG. 3 illustrates the belt buckle feeder 10 including the belt buckle 12 in the home position, while FIG. 4 shows the belt buckle feeder 10 including the belt buckle 12 (not shown here) in the feeding position.

The spindle drive illustrated in detail in FIGS. 3 and 4 includes a spindle nut 26 which is screwed onto the spindle 14. The spindle 14 has an appropriate thread (not shown) along its entire height-movable length.

A drive gearwheel 28 engaged in an external tooth system (not shown) of the spindle nut 26 which is equally located between the casing shells 20, 22 is arranged in parallel to the spindle nut 26. The drive gear wheel 28 is connected to the flexible shaft 16 and is rotated by the same. The rotation of the drive gearwheel 28 is transmitted to the spindle nut 26, whereupon the spindle 14 is moved in the longitudinal direction through the spindle nut 26 so that its extended length and thus the position of the belt buckle 12 can be varied.

In order to prevent co-rotation of the spindle 14 a locking device 30 which is disposed in a guide 32 formed in either of the casing shells 20, 22 is arranged at the lower end of the spindle 14. This is illustrated in FIG. 4.

The spindle out 26 is supported in a bearing 34 to be stationary but rotatable, the bearing 34 being split (with respect to the Figures) into upper and lower bearing blocks 36, 38. The lower bearing block 38 is tightly fixed between the casing shells 20, 22. The two upper bearing blocks 36 are arranged on opposite sides of the spindle 14 and rest on the lower bearing block 38.

Each of the two upper bearing blocks 36 includes an opening 40 through which a securing pin 42 is passed by which the two casing shells 20, 22 are riveted to each other.

Each of the securing pins 42 moreover connects a locking element 44 to the casing shells 20, 22 by the securing pin 42 reaching through openings in the locking element 44 that are aligned with the openings 40.

The two locking elements 44 are arranged at the belt buckle-side end of the casing shells 20, 22 and thus are located between the belt buckle 12 and the spindle nut 26.

Both locking elements 44 are bent in one piece of a sheet metal and, apart from two securing tabs 46 including the openings through which the securing pins 42 are projecting, include a tab comprising an eyelet 48 through which the spindle 14 extends. The locking elements 44 are mirror-inverted and are arranged above the upper bearing blocks 36.

In normal vehicle operation the locking elements 44 and the eyelets 48 are in the position shown in FIGS. 1 to 8 in which the eyelet 48 extends perpendicularly to the spindle 14 and during height adjustment the spindle 14 moves through the eyelets 48 without contacting the inner edge thereof. The entire bearing 34, i.e. both the lower bearing block 38 and the upper bearing blocks 36 are constantly maintained in the same shape and position. This is also applicable to the normal driving operation, when tensile forces F acting on the belt buckle 12 which are not excessively high in the direction R of the feeding position attempt to pull the spindle 14 upwards out of the casing shells 20, 22. Those tensile forces acting on the belt buckle 12 are transmitted via the spindle nut 26 to the bearing 34 and from there into the casing shells 20, 22 and into the vehicle.

The connection of the spindle nut 28 to the thread of the spindle 14 is configured so that it can easily withstand forces occurring during normal vehicle operation approximately corresponding to forces having an upper limit of 7 to 9 kN.

If a higher tensile force F is applied, for example during accident when force is exerted via the vehicle occupant on the webbing and thus on the belt buckle 12, the spindle 14 and consequently the spindle nut 26 are pulled upwards (in the Figures) in the feeding direction R. The spindle nut 26 includes a stop 50 in the form of a peripheral radial shoulder opposing a stop face 51 on the lower side of the upper bearing blocks 38 (see FIGS. 4 and 9, resp.).

During normal operation the stop 50 does not contact the stop face 51. Only when the predetermined force threshold of about 7 to 9 kN is exceeded, the stop 50 on the spindle nut 26 is pulled so as to contact the stop face 51 of the upper bearing blocks 36 so that the latter, too, are loaded in the direction of the tensile force F.

A deflecting member 52 which in the illustrated example is identical to either of the two upper bearing blocks 36 is assigned to each of the locking elements 44 (see FIG. 9). Upon application of force above the predetermined force threshold the deflecting member 52 starts deforming, pivoting and/or moving in the direction of the tensile force F. Accordingly, the respective deflecting member 52 urges against the superimposed locking element 44 and exerts force directed upwards (in the Figures) on the same.

Since the locking elements 44 are pivotally hinged to the casing shells 20, 22 via the mounting pins 42, a movement of the two deflecting members 52 results in pivoting of the two locking elements 44. As a result, the tabs of the locking elements 44 including the eyelets 48 are tilted with respect to the cross-section of the spindle 14. Thus an inner edge 54 of the eyelet 48 in portions contacts the peripheral surface of the spindle 14.

This situation is illustrated in FIGS. 9 and 10.

The shape and the material of the locking elements 44, especially of the edge of the eyelets 48, are selected so that the inner edge 54 of the eyelet 48 cuts into the outer periphery of the spindle 14 and somewhat digs into the material of the spindle 14 or at least wedges between two windings of the thread.

When the extension force F is increased, the edge 43 of the eyelet 48 is increasingly cut into the spindle 14 so that constantly improving force and form fit occurs between the locking element 44 and the spindle 14.

As soon as the locking element 44 contacts the spindle 14, the flux of force is no longer effectuated via the spindle 14, the spindle nut 26, the bearing 34 and the casing shells 20, 22 but via the spindle 14, the locking elements 44, the mounting pins 42 and the casing shells 20, 22 through the mounting portion 24 directly into a component fixed to the vehicle. Only these components have to be designed for absorbing the high forces in the range of up to approx. 25 kN acting in the case of accident.

Therefore, in the present example the spindle nut 26 is made of plastic material. It is loaded at no time beyond its breaking load of approx. 10 to 15 kN, as the flux of force is guided via the locking elements 44 already in the case of lower forces.

Therefore the entire spindle drive can also be dimensioned to be smaller, for merely the casing shells 20, 22, the locking elements 44 and the spindle 14 have to be designed as load-bearing components. This permits a very slender design of the entire belt buckle feeder 10 which therefore is perfectly suited also for use with the front seats, for example.

The locking elements 44 and the two casing shells 20, 22 are made of sheet steel in this case.

Figure 11:
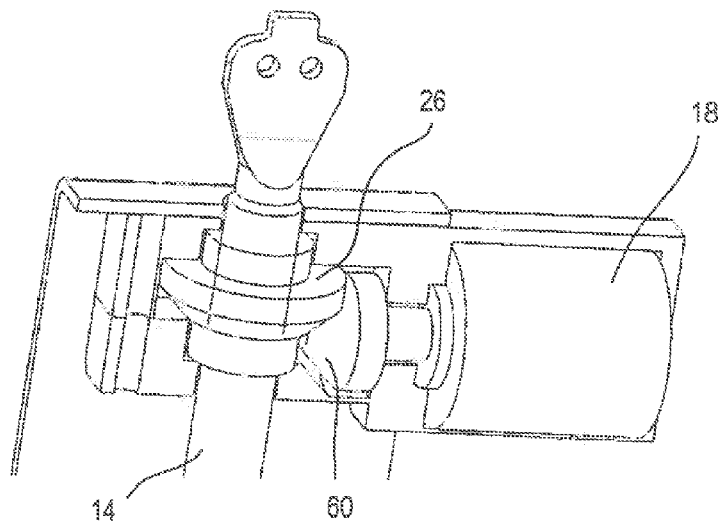
FIG. 11 shows a schematic perspective view of a bevel-gear drive for the spindle drive of a belt buckle feeder according to the invention.
Figure 12:
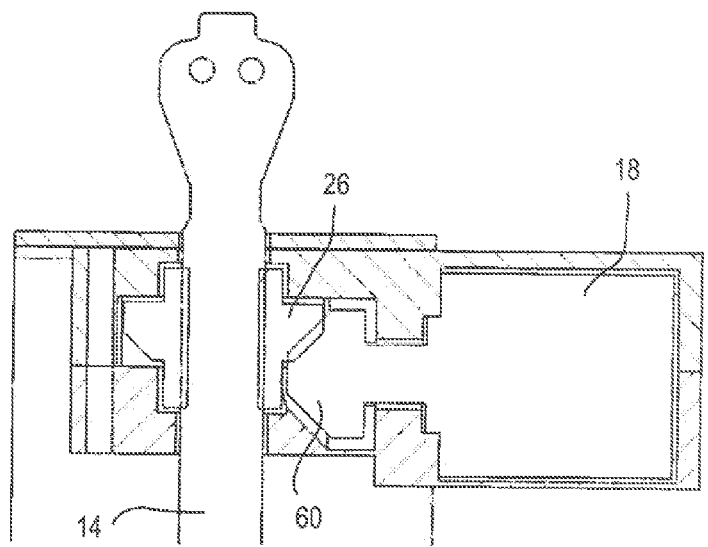
FIG. 12 shows a schematic sectional view of the subassembly of FIG. 11.

FIGS. 11 and 12 illustrate a drive variant in which the spindle nut 26 is not driven via a parallel gearwheel but via a bevel gear 60. In this case an electric motor 18 is provided directly on the belt buckle feeder 10, but the bevel gear could as well be connected, as described in the previous example, to the electric motor 18 via a flexible shaft.

Figure 13:
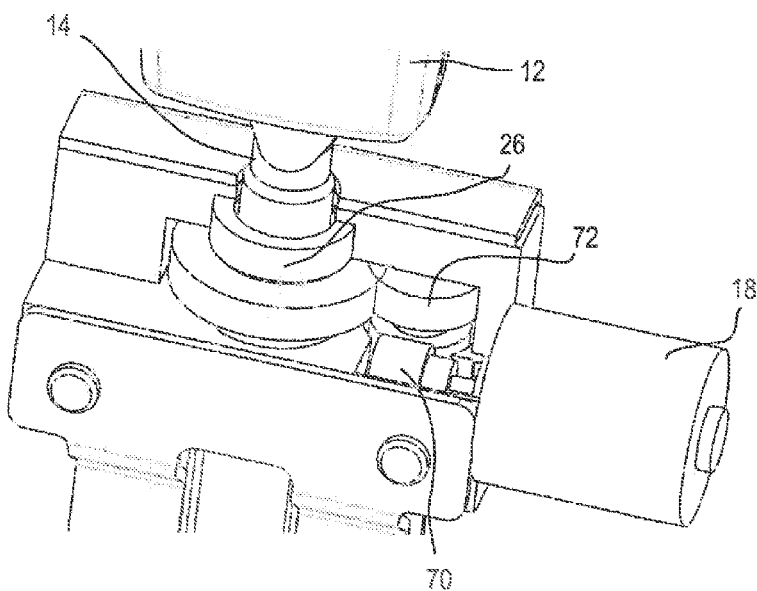
FIG. 13 shows a schematic perspective view of a worm-gear drive for a spindle drive of a belt buckle feeder according to the invention.
Figure 14:
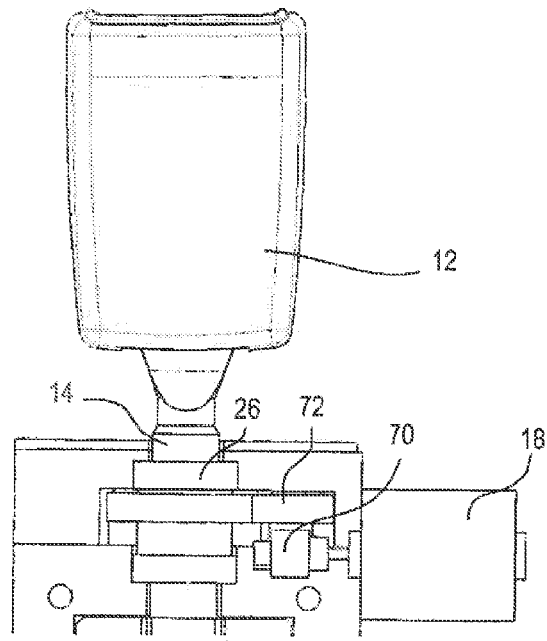
FIG. 14 shows a schematic sectional view of the subassembly of FIG. 13.

In FIGS. 13 and 14 a drive of the spindle nut 26 via a worm gear is illustrated in which a worm 70 connected to an electric motor 18 drives a worm wheel 72 which in turn is engaged in an external tooth system on the spindle not 26 and is adapted to rotate the latter.

The worm 70 could as well directly drive the spindle nut 26; in this case the external tooth system thereof is in the form of a worm wheel.

In this case, too, the electric motor 18 can be arranged directly on the belt buckle feeder or can be connected to the worm 70 via a flexible shaft.

In these examples the locking elements 44 are not shown, however the drive shown in FIGS. 11 and 12 and, resp., in FIGS. 13 and 14 can be employed instead of the spindle drive shown in FIGS. 1 to 10, as a matter of course.

The invention claimed is:

1. A belt buckle feeder for a vehicle seat heft system comprising a spindle drive and a belt buckle (12) mounted to a spindle (14) of the spindle drive, the belt buckle being movable in height via a spindle nut (26) located on the spindle (14), and comprising a safety mechanism including at least one locking element (44) which is configured so that the locking element (44) enters into force fit and/or form fit with the spindle (14), when a predetermined force threshold is exceeded, and introduces force acting on the belt buckle (12) in the extending direction (R) of the spindle (14) into a mounting point fixed to the vehicle while bypassing the spindle drive.

2. The belt buckle feeder according to claim 1, wherein the safety mechanism includes at least one deflecting member (52) configured to change its position when the force threshold is exceeded, thereby the locking element (44) adopting an engaged position in which it contacts the spindle (14).

3. The belt buckle feeder according to claim 2, wherein the deflecting member (52) is a bearing (34) of the spindle nut (26) and/or is deflected by the spindle nut (26) when the predetermined force is exceeded.

4. The belt buckle feeder according to claim 3, wherein the locking element (44) is pivoted to the deflecting member (52) and/or pivoted to a casing she (20, 22).

5. The belt buckle feeder according to claim 3, wherein the locking element (44) is adapted to be coupled to the spindle (14) between the belt buckle (12) and the spindle nut (26).

6. The belt buckle feeder according to claim 3 wherein the spindle nut (26) includes a stop (50) which is capable of contacting the deflecting member (52).

7. The belt buckle feeder according to claim 2, wherein the locking element (44) includes an eyelet (48) through which the spindle (14) extends, wherein in the engaged position an inner edge (54) of the eyelet (48) engages in the outer periphery of the spindle (14).

8. The belt buckle feeder according to claim 1, wherein the flux of force occurs from the spindle (14) via the locking element (44) and at least one casing shell (20, 22) to a mounting point of the casing shell (20, 22) on the vehicle.

9. The belt buckle feeder according to claim 1, wherein the spindle nut (26) is made of plastic material.

10. The belt buckle feeder according to claim 1, wherein the spindle nut (26) is driven by means of a gearwheel (28), a worm gear (72) or a bevel gear (60).

11. The belt buckle feeder according to claim 1, wherein the spindle nut (26) is driven by means of a flexible shaft (16) and/or an electric motor (18).

\* \* \* \* \*

UNITED STATES PATENT AND TRADEMARK OFFICE
CERTIFICATE OF CORRECTION

| | | |
|---|---|---|
| PATENT NO. | : 9,238,447 B2 | Page 1 of 1 |
| APPLICATION NO. | : 14/420711 | |
| DATED | : January 19, 2016 | |
| INVENTOR(S) | : Christian Hoika et al. | |

It is certified that error appears in the above-identified patent and that said Letters Patent is hereby corrected as shown below:

Claims

Column 6, claim 1, line 53 reads "heft" should read --belt--

Column 7, claim 4, line 9 reads "to a casing she" should read --to a casing shell--

Signed and Sealed this
Twelfth Day of April, 2016

Michelle K. Lee
*Director of the United States Patent and Trademark Office*